(12) United States Patent
Lier et al.

(10) Patent No.: US 9,050,670 B2
(45) Date of Patent: Jun. 9, 2015

(54) PIPE DISCONNECTING DEVICE

(75) Inventors: Andreas Lier, Hilzingen (DE); Markus Tamm, Ueberlingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1694 days.

(21) Appl. No.: 12/527,245

(22) PCT Filed: Jan. 28, 2008

(86) PCT No.: PCT/EP2008/050956
§ 371 (c)(1),
(2), (4) Date: Mar. 28, 2010

(87) PCT Pub. No.: WO2008/101765
PCT Pub. Date: Aug. 28, 2008

(65) Prior Publication Data
US 2010/0205809 A1 Aug. 19, 2010

(30) Foreign Application Priority Data
Feb. 20, 2007 (DE) .......................... 10 2007 008 355

(51) Int. Cl.
*B23D 45/12* (2006.01)
*B23D 47/00* (2006.01)

(52) U.S. Cl.
CPC .............. *B23D 45/126* (2013.01); *B23D 47/00* (2013.01)

(58) Field of Classification Search
CPC ............................. B23D 45/126; B23D 47/00
USPC .......... 30/92–95, 97–99, 101–102, 232, 295, 30/109–113; 16/405–430, 439, 110, 16/110.1–114.1; 7/167; 83/452, 455, 83/743–744, 471, 2, 54, 200.1, 861–887
See application file for complete search history.

(56) References Cited

U.S. PATENT DOCUMENTS

| | | | | |
|---|---|---|---|---|
| 931,729 A * | 8/1909 | Byers | ................................. | 30/96 |
| 2,769,235 A * | 11/1956 | Martois | ............................. | 30/97 |
| 3,974,562 A * | 8/1976 | Wuchner | ............................. | 30/97 |
| 6,129,488 A * | 10/2000 | Fahr | ................................. | 407/31 |
| 6,141,876 A * | 11/2000 | Hamm | ............................. | 30/100 |
| 6,637,304 B2 * | 10/2003 | Singer | ............................. | 82/113 |
| 7,174,638 B2 * | 2/2007 | Singer | ............................. | 30/97 |

(Continued)

FOREIGN PATENT DOCUMENTS

| | | |
|---|---|---|
| CH | 372202 A | 9/1963 |
| DE | 19603361 A1 | 8/1997 |
| DE | 10134269 A1 | 2/2003 |

OTHER PUBLICATIONS

ISR for PCT/EP2008/050956 dated Apr. 11, 2008.

*Primary Examiner* — Boyer D Ashley
*Assistant Examiner* — Fernando Ayala
(74) *Attorney, Agent, or Firm* — Lowe Hauptman & Ham LLP

(57) ABSTRACT

The invention relates to a pipe disconnecting device, comprising a disconnecting device, which has a rotary body. The rotary body comprises a tool carrier for a disconnecting tool. A protrusion projects transversely to the rotational axis of the rotary body away from the rotary body or away from the tool carrier. At least one handle is attached to the protrusion, the handle extending across a region of the surface of the protrusion and forming a reach-through opening between the handle and the surface of the protrusion for a hand reaching for the handle.

17 Claims, 5 Drawing Sheets

(56) References Cited

U.S. PATENT DOCUMENTS

Figure 1:
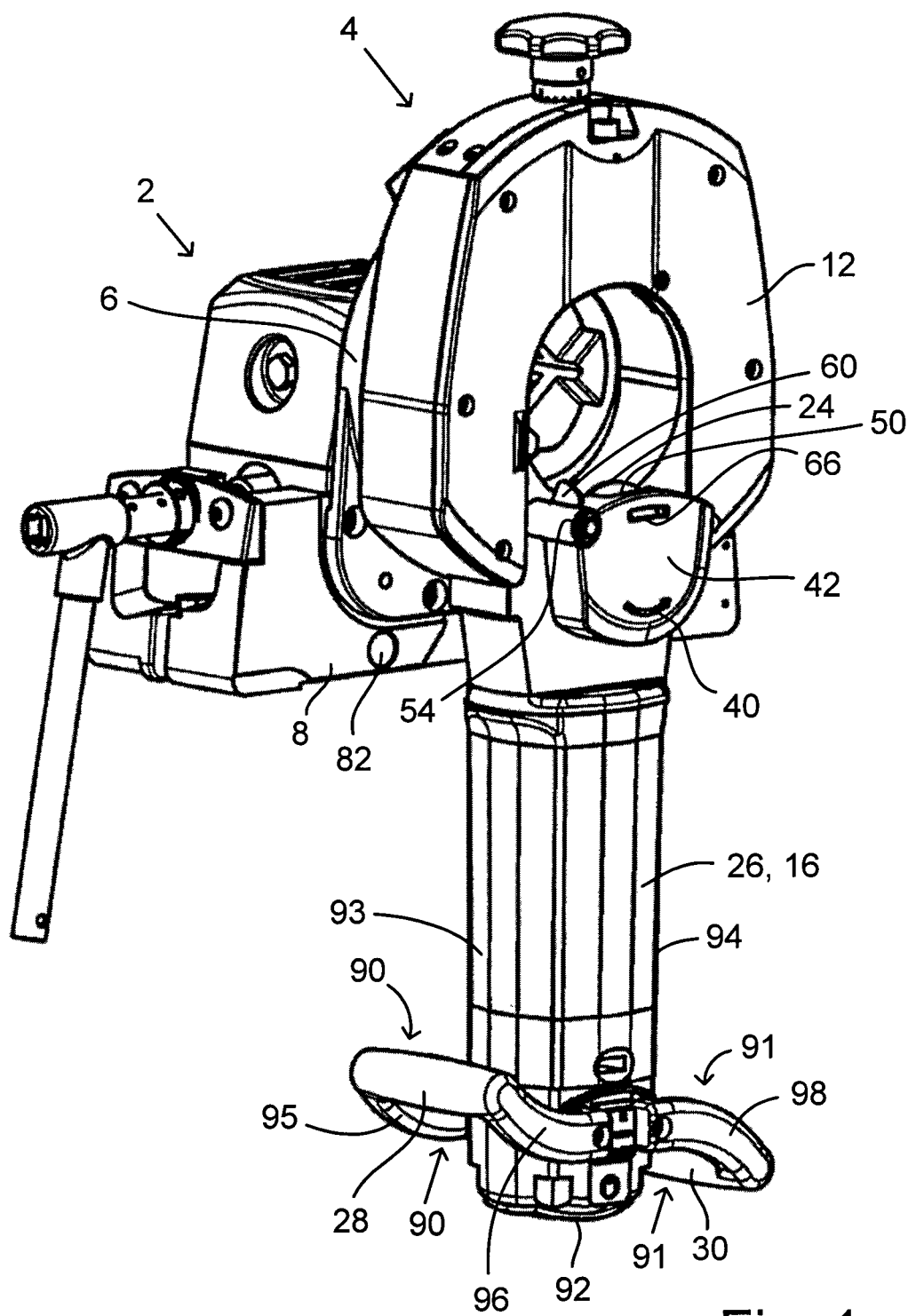

2001/0023540 A1* 9/2001 Kramer .............................. 30/92
2005/0097752 A1 5/2005 Singer
2005/0126009 A1* 6/2005 Stones ............................. 30/100
2010/0101094 A1* 4/2010 Schneider ........................ 30/97

* cited by examiner

PIPE DISCONNECTING DEVICE

RELATED APPLICATIONS

The present application is based on International Application Number PCT/EP2008/050956 filed Jan. 28, 2008, and claims priority from German Application Number 10 2007 008 355.8 filed Feb. 20, 2007, the disclosures of which are hereby incorporated by reference herein in their entirety.

The present invention relates to pipe cutting equipment defined in the preamble of claim 1.

Pipe cutting equipment is known for instance from the patent documents CH 372 202; DE 101 34 269 B4; US 2005/0,097, 752 A1.

The objective of the present invention is to improve the manual handling of the pipe cutting equipment.

This problem is solved by the present invention by the features of claim 1.

Accordingly the present invention relates to pipe cutting equipment comprising a cutting system fitted with a rotary unit that rests in rotatable manner about an axis of rotation on a bearing and that is fitted with a tool support for a pipe cutting tool, the tool support being mounted to the rotary unit so as to be displaceable transversely to said axis of rotation; said equipment further comprising a lever-like post laterally extending from the rotary unit or from the tool support transversely to the axis of rotation; at least one handlebar at said post to rotate the aggregate of rotary unit, tool support and post about the axis of rotation of the rotary unit, characterized in that the minimum of one handlebar extends over at least part of the post's contour while spaced from its surface, a handlebar clearance for a hand seizing said handlebar being subtended between it and the post's surface.

The present invention offers the following advantages: reducing the danger that the rotary unit together with the tool be tilted—by a manual force applied to the handlebar—relative to the rotary unit's axis of rotation entailing a shift in the cutting site of the pipe being cut. There is danger in known pipe cutting equipment where the handlebar extends away from the rotary unit's axis of rotation of generating a substantial transverse torque and hence a shift in cutting site. The present invention also offers the advantage of allowing cutting curving pipes, that is pipes of small radii of curvature, because the handlebar of the present invention does not interfere with that leg of the curved pipe which projects out of the pipe cutting equipment. Again, the handlebar of the present invention is configured more ergonomically than in the state of the art.

Further features of the present invention are defined in the dependent claims.

The present invention is not restricted to the illustrative embodiment mode shown in the appended drawings. It applies also to other pipe cutting equipment, for instance those wherein the tool support is displaceable along an element pivotably resting on the rotary unit. Preferably the cutting tools shall be circular saw blades or cutting grinding disks, though the cutting tool of other pipe cutting equipment also may be a parting tool such as used on lathes and therefore requiring no rotary drive. In the latter case, however, a rotary drive, in particular an electric, pneumatic or hydraulic motor may be used to drive the rotary unit in an embodiment mode where said rotary unit not only may be rotated manually at the rotary handlebar, but also by a motor.

The present invention is elucidated below by preferred embodiment modes shown in the appended drawings.

Figure 2:
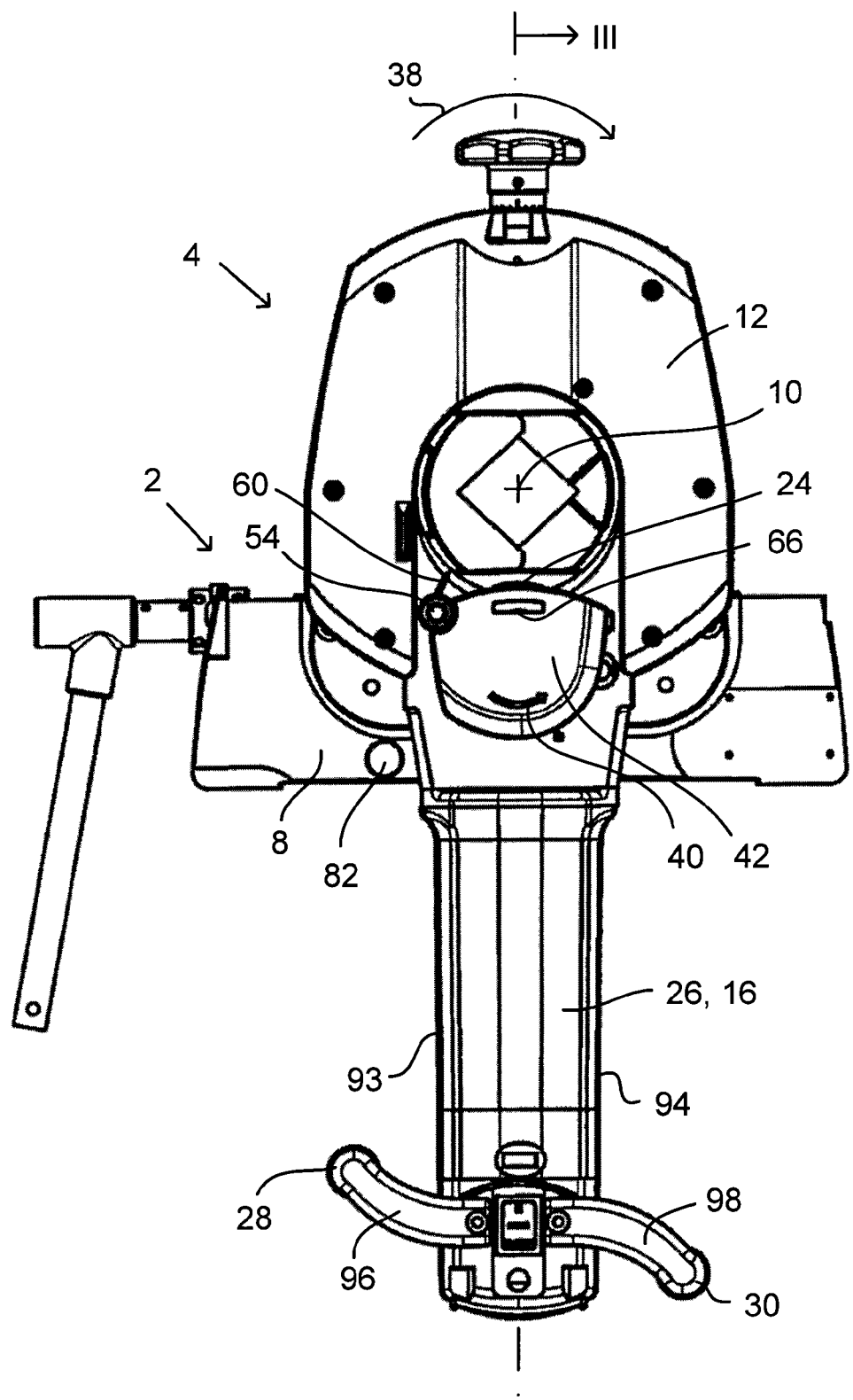
Figure 3:
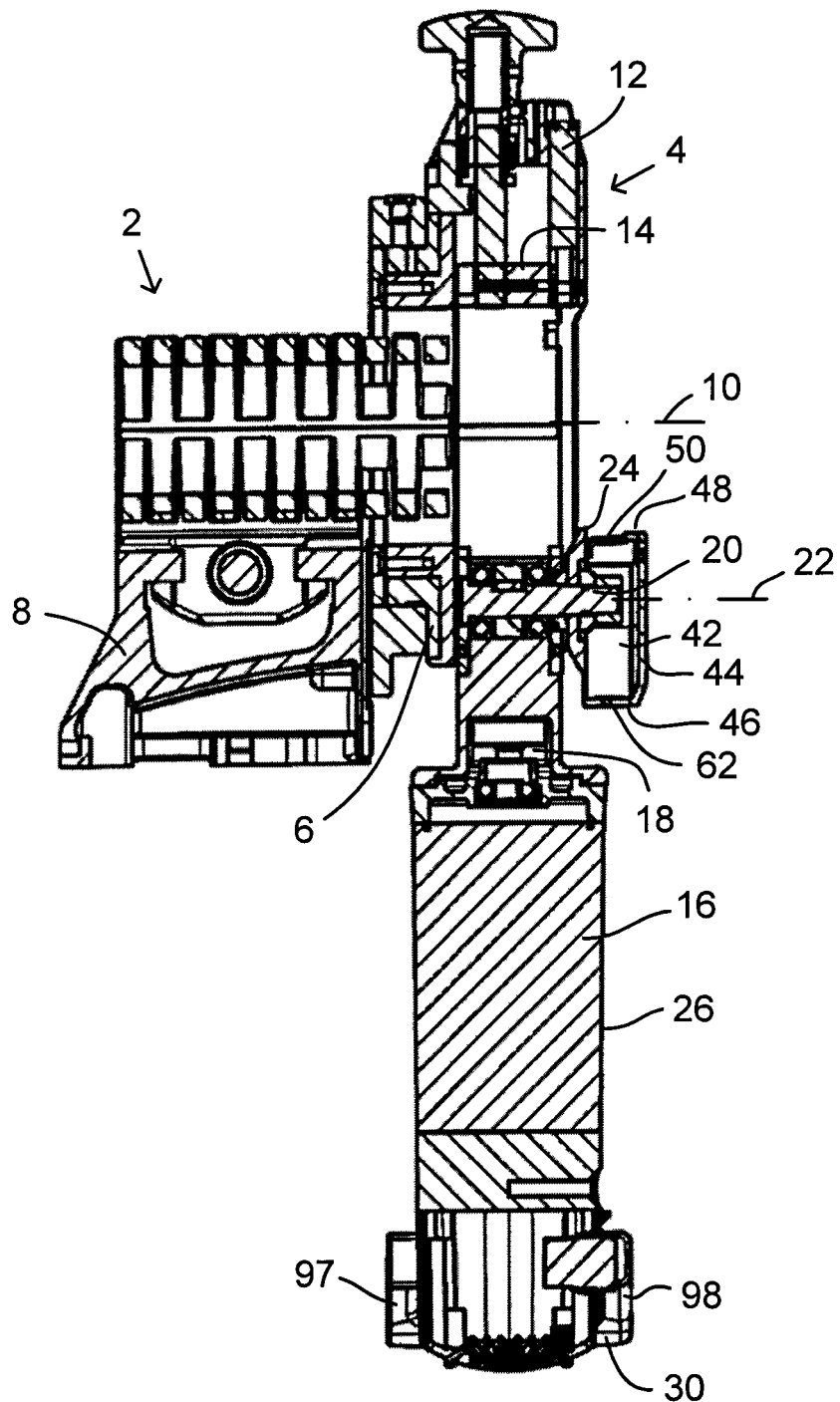
Figure 4:
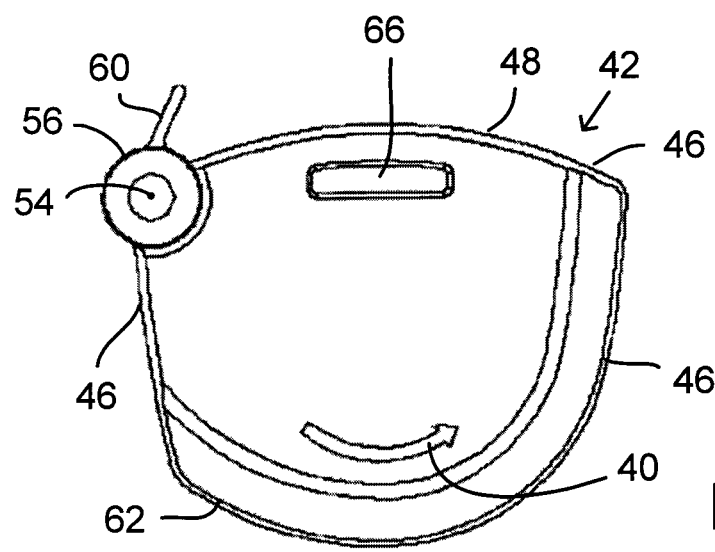
Figure 5:
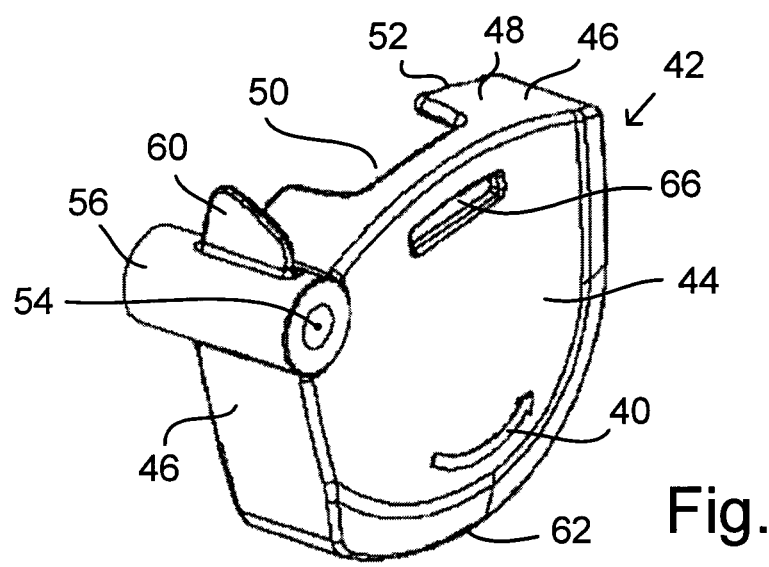
Figure 6:
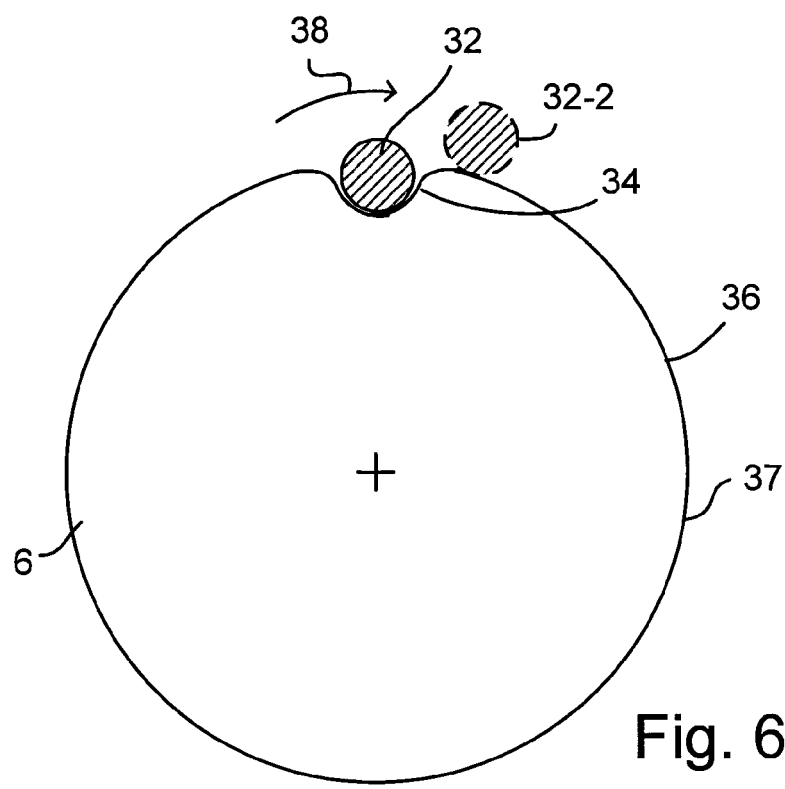
Figure 7:
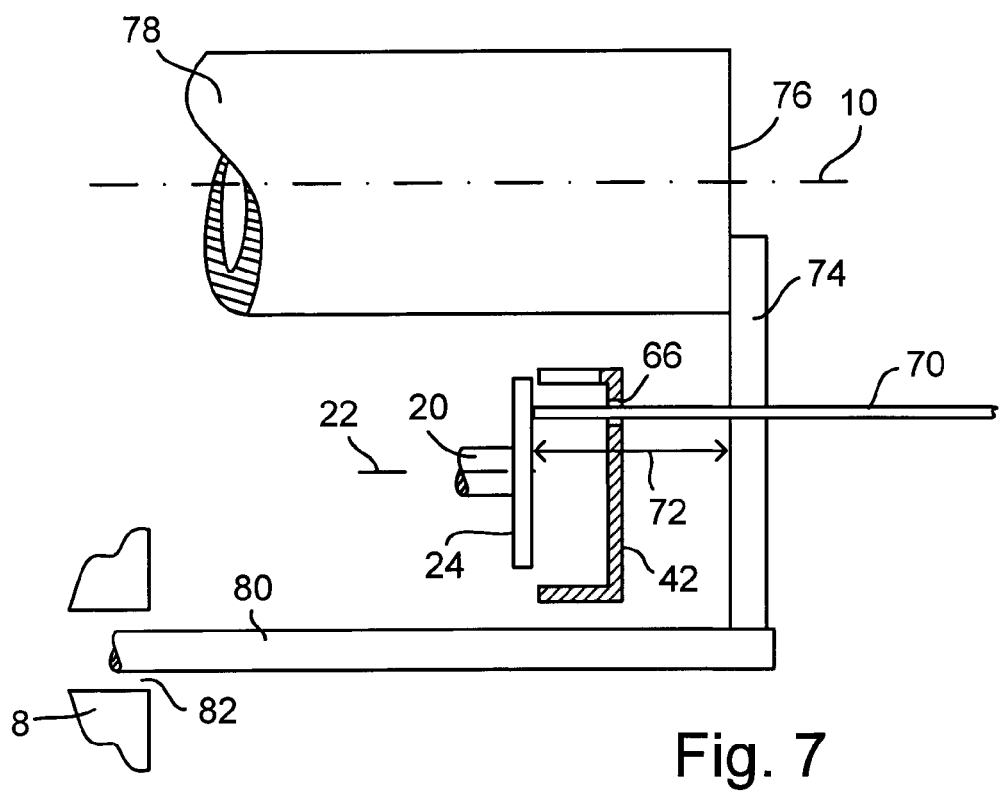

FIG. 1 is an oblique front view perspective of the pipe cutting equipment of the invention, FIG. 2 is a front view of the pipe cutting equipment of FIG. 1, FIG. 3 is a vertical axial section along the plane of FIG. 2, FIG. 4 is a front view of a safety shield of the pipe cutting equipment, FIG. 5 is a perspective of the safety shield seen obliquely from above, FIG. 6 is a cam disk drive to radially displace a slider which bears a cutting tool, and FIG. 7 schematically shows parts of the pipe cutting equipment allowing measuring and adjusting the pipe length to be cut off.

The pipe cutting equipment shown in the drawings contains a clamp 2 for instance like a vise to affix a pipe being cut, and a cutting system 4 to cut a pipe affixed in the clamp. The cutting system 4 comprises a guide ring 6 which is solidly joined to a base 8 of the clamp 2 and defines an axis of rotation 10 (FIG. 3), a rotary unit 12 of the cutting system 4 being rotationally supported on the guide ring 6 and rotatable 360° about said axis. This axis of rotation 10 of the rotary unit 12 is aligned with the center axis, defined by the clamp, of the pipe to be cut.

The rotary unit 12 comprises a slider 14 guided within it radially to the axis of rotation 10 unit in easily displaceable manner. A tool shaft 20 driven by a motor 16 through a gear unit 18 is rotatably supported on the slider 14. A cutting tool 24 is irrotationally affixable to said shaft 20 and consequently rotates jointly with it. The axis of rotation 22 of the tool shaft 20 is configured parallel to the axis of rotation 10 of the rotary unit 12.

The cutting tool 24 is disk-like and illustratively may be a circular saw blade or a grinding cutting disk.

The drawings show the cutting system 4 in a nulled direction of rotation.

In this configuration the cutting tool 24 is situated radially down away from the pipe to be cut and a post 26 connected to the slider 14 and containing a motor 16 or being constituted at least in part by a motor casing runs from the slider 14 downward like a lever arm. At its outer end away from the slider 14, the post 26 is fitted with at least one or two handlebars 28 and 30. The post runs transversely, preferably radially to the axis of rotation 10 of the rotary unit 12.

In the direction-of-rotation null position shown in the drawings, the slider 14, by means of a guide bolt 32 affixed to it, rests in a cam notch 34 of a guide track running through 360°. This condition is schematically shown in FIG. 6. The guide bolt 32 is affixed to the slider 14. The guide track 36 is constituted at the guide ring 6 or at a cam disk irrotationally connected to the guide ring 6. The guide track segment 37 on each side of the cam notch may be circular, its circle origin being situated in the axis of rotation 10 of the rotary unit 12.

When, by being rotated about its axis of rotation 10, the rotary unit 12 is moved out of its direction-of-rotation null position, the guide bolt 32 shall be lifted out of the cam notch 34 onto the guide track segment 37 as indicated in FIG. 6 by the dashed position 32-2 of this guide bolt. The radius of the guide track segment 37 is larger than the radius subtended by the trough of the cam notch 34. By said lifting the guide bolt 32 out of the cam notch 34 onto the radially higher guide track segment 37, the slider 14 shall be raised a corresponding distance and hence also the cutting tool 24 shall commensurately enter a pipe to be cut. During the continuing rotation of the rotary unit 12, the slider 14 and of the cutting tool, about the said rotary unit's axis of rotation 10, for instance in the direction of rotation 38, the cutting tool 24 remains in the wall of said pipe being cut and as a result cutting will be completed. When the rotary unit 12 has been rotated by 360°, the guide bolt relapses into the cam notch 24 and thereby the cutting tool 24 together with the slider 14 drops radially out of the region of the pipe to be cut.

The radially advancing and retracting motions of the cutting tool 24, described in relation to FIG. 6, relative to the pipe to be cut represent only one of several modes of implementation. Other embodiment modes of the state of the art also are applicable.

The direction of rotation 38 of the rotary unit 12 together with the slider 14 and the cutting tool 24 preferably is opposite the direction of rotation 40 of said cutting tool as illustratively indicated in FIG. 2 by the arrows 38 and 40. Illustratively the direction of rotation 38 of the rotary unit 12 is clockwise and the direction of rotation 40 of said tool is shown counterclockwise and as a front view of the cutting system 4.

A safety shield 42 is mounted in front of the cutting tool 24 to prevent an operator or other person from accidentally touching an operating cutting tool, further to catch/deflect chips removed by said cutting tool from the pipe being cut and being flung away.

The safety shield 42 comprises a front wall 44 and a peripheral wall 46 pointing away from the said front wall toward the cutting tool 24. On a portion 48 or the like radially opposite the position of the pipe and the axis of rotation 10 of the rotary unit 12, the peripheral wall 46 is fitted with a recess 50 through which the cutting tool 24 may protrude toward the pipe. Preferably the recess 50 is into the edge and runs as far as the peripheral rim 52 of the peripheral wall 46. The inside diameter of the peripheral wall 46 is larger radially toward the tool shaft's axis of rotation 22 than the outside diameter of the cutting tool 24, so that cutting tool may enter the safety shield 42. The peripheral wall 46 axially runs as far as the position of the cutting tool 24 or axially beyond it.

The safety shield 42 is supported at the slider 14 to be pivotable about pivot axis 54 parallel to the axis of rotation 22 of the tool shaft 20 against a spring force exerted in the direction away from axis of rotation 10 of the rotary unit 12. The spring is omitted from the drawings and preferably received in a spring housing 56 which preferably shall be integral with the safety shield 42.

When the slider 14 together with the cutting tool 24, illustratively as described above, is displaced radially, the cutting tool 24 will be set in place and be moved into the pipe wall, this pipe radially forcing away the safety shield 42 and the safety shield 42 thereby being pivoted about its axis of rotation 54. In this way the cutting tool 24 within or very near beside the recess 50 can project from the safety shield 42 and penetrate the pipe.

The safety shield 42 is fitted with a protective rib 60 which runs in the direction of rotation 40 of the cutting tool 24 beyond the recess 50 and projects from the outer periphery of the peripheral wall 46 of the safety shield 42 is configured transversely to the direction of rotation 40 of said cutting tool and in the path of the flung-out chips removed by the cutting tool 24 from the pipe being cut. In this manner the protective rib 60 stops or deflects pipe chips into a direction where they are negligible or not bothersome at all to the operator.

Preferably the protective rib 60 is integral with the safety shield. Preferably the protective rib 60 is configured on the spring housing 56 of the safety shield 42.

The pivot axis 54 and the protective rib 60 of the safety shield 42 are situated in the direction of rotation 40, of the tool shaft 20 and hence also of the cutting tool 24, beyond the recess 50.

The peripheral wall 46 is round at its lower peripheral segment 62 opposite the recess 50 and its inner radius preferably is larger than that of the cutting tool 24. Said peripheral wall's upper segment 48 fitted with the recess 50 is shallower, as seen in the peripheral direction, than the opposite lower peripheral segment 62.

The front wall 44 of the safety shield 42 preferably comprises an open slot 66 configured axially opposite the cutting tool 24 at a site radially spaced from the tool shaft 20. In this manner and as shown in FIG. 7, a measuring stick 40 may be fed through the open slot 66 to reach the cutting tool 24 in order to measure its distance to a pipe end projecting forward from the cutting system of a pipe-to-be-cut 78 or its distance from a positioning stop 74 which can be axially displaced in controlled manner at the pipe cutting system, said stop being available to position the pipe end 76 of said pipe-to-be-cut 78. Illustratively the positioning stop 74 projects radially away from a positioning rod 80 running parallel to the axis of rotation 10 of the rotary unit 12 and which may be axially guided and positioned for instance in a borehole 82. Illustratively the borehole 82 is situated in a base 8 of the clamp 2.

The slot 66 preferably is an open slot. To match conventional measuring sticks, the open slot preferably is between 10 and 25 mm long and preferably between 2 and 8 mm wide.

As shown by FIGS. 1, 2 and 3, at least one handlebar 28 or 30 is affixed to or constituted on the post 26 and runs over at least part of the contour of the post a distance from said post's surface, a handlebar clearance 90 respectively 91 being constituted between the handlebar 28 respectively 30 and the surface of the post 26 for the operator's hand on the said handlebars 8 and 30.

The handlebar 28 respectively 30 may run above the drawings' lower peripheral surface 92 of the post 26, said surface being radially away from the post 26.

According to the preferred embodiment mode shown in the drawings, the surface 93 respectively 94 of the post 26 is spanned by at least one handlebar 28 respectively 30 and is such as to point in a peripheral direction 38 respectively 40 about the axis of rotation 10 of the rotary unit 12.

The minimum of one handlebar 28 respectively 30 each preferably is situated in the radially outer end zone of the post 26.

However the minimum of one handlebar 28 respectively 30 each may be linked, by a single bracket affixed to the handlebar's center, to the post 26, or, according to the preferred embodiment mode of the invention and as shown in the drawings, each may be linked at both handlebar ends by a bracket 95, 96 respectively 97, 98 to said post.

According to the preferred embodiment mode of the invention, the brackets 95, 96, 97 and 98 are arcuate, where the brackets 95 and 96 respectively 97 and 98 of the particular handlebar 28 respectively 30 are configured in mutually parallel manner and are arcuate when viewed axially to the axis of rotation 10 of the rotary unit 12.

Where two handlebars 28 and 30 are used, the brackets 95, 96, 97, 98 of the two handlebars 28 and 30 may curve in the same direction, for instance the arcuate inside of all brackets pointing to or away from the axis of rotation 10. Preferably, as seen axially toward the axis of rotation 10, the arcuate inside of the brackets 95 and 96 of the handlebar 28 points to the axis of rotation 10 of the rotary unit 12, whereas the arcuate inside of the brackets 97 and 98 of the other handlebar 30 points away from the axis of rotation 10. Preferable again, in this configuration, the brackets 95, 96 of one of the handlebars, namely 28, of which the arcuate inside points toward the axis of rotation 10, project away from the post 26 in the direction of rotation 38 of the rotary unit 12, whereas the brackets 97,

98 of the other handlebar 30 project in the opposite direction from the post 26, for instance in the direction of rotation 40 of the cutting tool 24.

In each embodiment mode discussed above, the slider serves as the tool support. However other embodiment modes also are feasible. For instance in one design, the slider is not displaceable relative to the rotary unit, but instead is displaceable relative to an element which is supported by the rotary body to be pivotable about a pivot axis.

In the illustrative embodiment of the invention, the motor is housed in the post. In further embodiment modes, the post also may contain a gear unit configured between the motor and the cutting tool. In still another design, the post may be constituted by the motor itself. In the latter case the minimum of one handlebar is affixed to the motor casing.

Further variations of the invention suggest themselves to the expert considering the specification, claims and drawings.

The invention claimed is:

1. Pipe-cutting equipment comprising:
a cutting system fitted with a rotary unit which is rotatable about an axis of rotation, while supported on a bearing which further includes a tool support for a pipe-cutting tool, said tool support being attached to the rotary unit in a manner to be displaceable transversely to said axis of rotation; further comprising a post acting like a lever arm and projecting laterally from the rotary unit or the tool support transversely to the axis of rotation; further at least one handlebar configured at the post to rotate the combination of rotary unit, tool support and post about the axis of rotation of the rotary unit, characterized in that
at least one handlebar extends over at least part of the contour of the post while being spaced from the surface of the post, and a handlebar clearance for the operator's hand seizing the handlebar being configured between the handlebar and the surface of the post, characterized in that the equipment includes at least two handlebars, wherein at least two of the handlebars are configured on opposite sides of the longitudinal axis of the post.

2. Pipe cutting equipment as claimed in claim 1, characterized in that the surface of the post spanned at least in part by at least one handlebar is a surface having a direction of extension that is normal to the axis of rotation of the rotary unit.

3. Pipe cutting equipment as claimed in claim 1, characterized in that at least one handlebar is configured at a radially outer end zone of the post.

4. Pipe cutting equipment as claimed in claim 1, characterized in that at least one handlebar in each case is linked by both its ends to the post.

5. Pipe cutting equipment as claimed in claim 1, characterized in that the two handlebar ends of each of the handlebars are each connected by means of an arcuate bracket to the post, said brackets being mutually parallel and, when seen axially with respect to the axis of rotation of the rotary unit, being arcuate.

6. Pipe cutting equipment as claimed in claim 5, characterized in that seen axially toward the axis of rotation of the rotary unit, the arcuate shape of the brackets connecting one of the handlebars to the post points by its arcuate inside toward the axis of rotation and the arcuate shape of the brackets of connecting another one of the handlebars to the post points by its arcuate outside toward the axis of rotation.

7. Pipe cutting equipment as claimed in claim 1, characterized in that to affix a pipe to be cut, the bearing is connected with a clamp affixing said pipe, as a result of which the clamp and the cutting system form one aggregate.

8. A device, comprising:
an assembly configured to clamp to a pipe;
an assembly configured to rotate about the clamped pipe and cut into the pipe;
a lever extending away from at least one of the assemblies; and
a handlebar, wherein
the handlebar spans a longitudinal axis of the lever; wherein the handlebar is a first handlebar, the device further comprising: a second handlebar; components linking the first handlebar to the lever; and components linking the second handlebar to the lever, wherein with respect to an axis of rotation of the assembly configured to rotate, the components linking the first handlebar to the lever have at least about an overall concave profile and the components linking the second handlebar to the lever have at least about an overall convex profile.

9. The device of claim 8, wherein:
the lever has an outer surface that extends along the direction of the longitudinal axis of the lever; and
at least one of the handlebars spans at least a portion of the outer surface that extends along the direction of the longitudinal axis, wherein a tangent surface of the outer surface spanned by the at least one of the handlebars is normal to an axis of rotation of the assembly configured to rotate.

10. The device of claim 8, wherein:
the lever has an outer surface extending along the direction of longitudinal axis of the lever; and
at least one of the handlebars is located directly above the outer surface that extends along the direction of the longitudinal axis.

11. The device of claim 8, wherein:
at least one of the handlebars has a longitudinal axis that is normal to and substantially offset from the longitudinal axis of the lever.

12. The device of claim 8, wherein:
at least one of the handlebars has a first and second handle end; and
each handle end is separately linked to the lever.

13. The device of claim 8, wherein at least one of the handlebars
spans the longitudinal axis of the lever on an opposite side thereof from the other of the handlebars.

14. A device, comprising:
an assembly configured to clamp to a pipe;
an assembly configured to rotate about the clamped pipe and cut into the pipe;
a lever extending away from at least one of the assemblies; and
two handlebars, wherein
the two handlebars have respective longitudinal axes that are substantially offset from the longitudinal axis of the lever, and, the two handlebars are respectively located on opposite sides of the longitudinal axis of the lever.

15. The device of claim 14, wherein:
the handlebars span the longitudinal axis of the lever.

16. The device of claim 14, wherein:
the handlebars have a first and second handle end; and
each handle end is separately linked to the lever.

17. The device of claim 14, wherein the handlebars
are arranged about the lever such that a user of the device can apply a first force at one side of the lever with one hand through the first handlebar and apply a second force at another side of the lever with another hand through the second handlebar.

* * * * *